J. SWAN.
Manufacture of Auger-Bits.

No. 209,782.  Patented Nov. 12, 1878.

Witnesses.
L. F. Connor.
N. E. Whitney.

Inventor.
James Swan
by Crosby & Gregory
Attys

UNITED STATES PATENT OFFICE.

JAMES SWAN, OF SEYMOUR, CONNECTICUT.

IMPROVEMENT IN THE MANUFACTURE OF AUGER-BITS.

Specification forming part of Letters Patent No. 209,782, dated November 12, 1878; application filed September 2, 1878.

*To all whom it may concern:*

Be it known that I, JAMES SWAN, of Seymour, county of New Haven, State of Connecticut, have invented an Improvement in the Method of and Mechanism for Manufacturing Auger-Bits, of which the following description, in connection with the drawings forming a part thereof, is a specification.

This invention relates to an improved method of and mechanism for manufacturing augers and auger-bits, and is specially applicable to that class of bits having gouge or curved lips; but it may be also readily applied to bits and augers having square lips.

In the manufacture of bits and augers as heretofore commonly practiced it has been usual, after twisting the bit and forming the center-point, to hold the lip or cutting part of the bit by hand against the concaved periphery of a rotating milling tool or wheel; but by such hand process it has been impossible to hold the bit sufficiently steady as to insure a uniform formation of the "clear" and "floor-lip" of the bit, as is necessary in order to make both lips cut alike, which is essential to the production and operation of a perfect bit. After such operation of the milling-tool it has always been necessary, by means of a file, to further finish the cutting portions of the bit to bring them into more uniform shape.

I have discovered that the center-point of the bit, if made at the proper taper, may be employed as the gaging-surface to determine with accuracy and uniformity the inclination for the clear of the bit, and during such operation, as the bit is moved forward, the floor-lips are also made exactly alike.

This invention consists, primarily, in that improvement in the method of forming the cutting portions and forming the clear of a bit or auger provided with a tapered unthreaded center-point which consists in advancing the bit in the direction of its length, while the tapered center-point is held by a rest, and partially rotating the said bit, as described, to thereby move the bit laterally and longitudinally with respect to the axis of a rotating cutting-wheel, which acts upon the bit to form the clear and shape it, as hereinafter described.

The invention also consists in certain combinations of mechanical devices, hereinafter more specifically set forth, and specified at the end of the specification.

Figure 1:
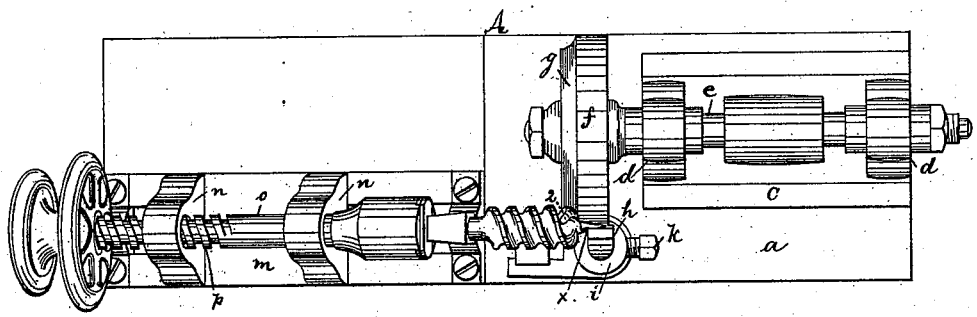
Figure 2:
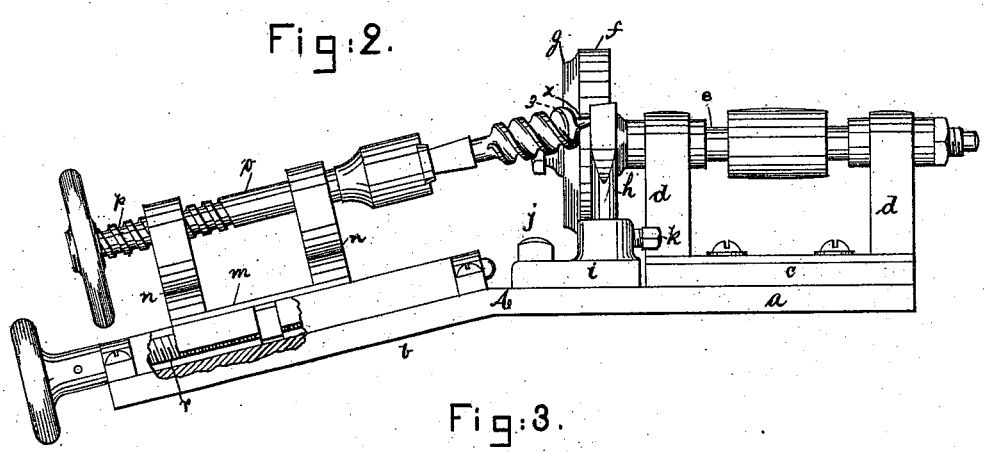
Figure 3:
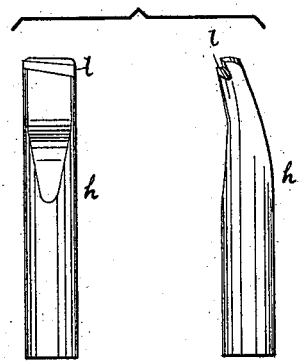
Figure 4:
Figure 5:

Figure 1 represents, in plan view, a machine for forming the cutting portions of bits or augers; Fig. 2, a side elevation thereof; Fig. 3, a face and side view of the rest, which receives and directs the center-point of the bit; and Figs. 4 and 5, details of the cutting portions of a bit, to be hereinafter referred to.

In this form of my invention I have shown in process of treatment a bit having a gouge or curved lip.

The bed A is shown as provided with two faces, $a\ b$, arranged at a slight angle with relation to each other. The face $a$ has a head, $c$, provided with bearings $d$ to receive the spindle $e$ of the friction wheel or cutter $f$, shown in this instance of my invention, as I prefer to use it, as a wheel concaved at its periphery, as at $g$, to correspond with the shape of the lip of the bit, the smooth portion or face of such concavity $g$ acting against the cutting portion of the bit, as in Figs. 1 and 2, to reduce or cut it away by friction rather than by milling, to thereby leave a smoother surface than if teeth were employed; but it will be understood that I may, if desired, provide the milling-tool with teeth, all as usual.

At the side of this friction-wheel, on the part $a$ of the bed, is placed an adjustable rest, $h$, held at its foot in a foot-plate, $i$, attached to the bed by a screw, $j$, a set-screw, $k$, providing for vertical adjustment of the rest in the said foot-piece. This rest has at its inner face (see Fig. 3) a shoulder or notch, $l$, to receive the center-point $x$ of the bit or auger.

On the portion $b$ of the bed is mounted a carriage, $m$, provided with bearings $n$, for the reception of the bit-advancing spindle $o$, which in this instance of my invention is shown as advanced by a screw, $p$, to cause the bit, its center-point having been placed in the notch $l$ of the rest, to travel forward against the action of the cutting-wheel or its concaved periphery, so that the said cutting-wheel will first act upon the cutting portion of the bit at 2, and follow along the edge 3 of the twisted portion of the metal as the bit is turned and moved forward by the bit-advancing spindle, so as to form the clear, and at the same time the cutting-wheel, acting upon the portion 4, from the point 2 backward to the point 5, forms the floor-lip.

It will be noticed that the center-point, being made tapering, and being moved forward, directed by the rest $h$ and the notch $l$ therein, will gradually force the center of the bit toward the center of the cutter $f$, and consequently it will be obvious that the bit as it is advanced and rotated will cause the cutting-wheel, which commences to cut at the point 2 and leaves off at the point 6, to gradually cut away some of the edge 3, from the point 2 to the point 6, which results in the formation of the clear, and at the same time the floor-lip is formed, leaving the parts of the bit acted upon by the acting portion $g$ of the cutter quite smooth, so as not to require subsequent filing; and it will also be obvious that this center-point, being guided positively, as described, will insure an exact correspondence in size and inclination of the cutting portions of the bit at each side of the center-point, which is the great aim of my invention.

In bits having but one cutting-lip a uniformity of inclination between the floor-lip and clear is insured. The carriage which supports the bit-advancing spindle $o$ is in this instance of my invention shown as made longitudinally movable by means of a screw, $r$, fixed on the bed. After the bit to be shaped at its cutting-edge is secured in the head of the bit-advancing spindle, then the carriage is moved forward by the screw $r$ until the end of the center-point $x$ is lodged upon or within the notch $l$ of the rest, and then the further forward motion of the bit in contact with the cutting-wheel and its rotation is derived from the movement of the bit-advancing spindle $o$. This rotation mentioned is never a complete rotation, but simply a partial rotation in reverse directions. The face $b$ of the bed is inclined from the face $a$ to increase the extent of the action of the cutter upon the "floor-lip."

The inclination or pitch of the screw $p$ of the bit-advancing spindle $o$ is made to correspond with the inclination of the face $b$ of the bed as compared with the face $a$; and the greater the pitch of the screw $o$ the greater the "clear."

I claim—

1. That improvement in the art or method of shaping the cutting portions and forming the clear of a bit or auger provided with a tapered unthreaded center-point which consists in advancing the bit in the direction of its length, while the tapered center-point is held by a rest, and partially rotating the said bit, as described, to thereby move the bit laterally and longitudinally with respect to the axis of a rotating cutting-wheel, which acts upon the bit being so moved forward laterally, and rotated to form the clear and shape the bit, substantially as set forth.

2. In a machine for shaping the cutting portions of bits and augers, the combination, with a cutting-wheel and mechanism for advancing the bit, of a rest to receive, hold, and direct the tapered point of the bit or auger while being acted upon to form the clear, substantially as described.

3. In a machine to shape the cutting portions of bits and augers and form the clear, the combination, with a rotating cutting-wheel, of a stationary rest to receive, hold, and direct the tapered center-point of the bit or auger while being advanced, and simultaneously therewith moved laterally by the action of the tapered point upon the rest, the cutting-wheel operating to form the clear, substantially as set forth.

4. In a machine to shape the cutting portions of bits and augers, the face $a$ of the bed and the cutting-wheel and rest thereon, combined with the fixed inclined face $b$ of the bed, the carriage $m$ mounted thereon, the screw to adjust the carriage longitudinally, and the screw-threaded bit holding and advancing spindle, to operate substantially as described.

In testimony whereof I have signed my name to this specification in the presence of two subscribing witnesses.

JAMES SWAN.

Witnesses:
G. W. GREGORY,
N. E. WHITNEY.